(12) United States Patent
Schmitt et al.

(10) Patent No.: US 6,357,836 B1
(45) Date of Patent: Mar. 19, 2002

(54) ELECTRONIC REAR BRAKE PROPORTIONING SYSTEM

(75) Inventors: Hubert E. Schmitt, Ochtendung; Anton Dehn, Limbach, both of (DE)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/385,332

(22) Filed: Aug. 30, 1999

Related U.S. Application Data

(60) Provisional application No. 60/039,793, filed on Mar. 4, 1997.

(51) Int. Cl.[7] .................................................. B60T 8/34
(52) U.S. Cl. ..................................... 303/113.5; 303/186
(58) Field of Search .............................. 303/113.5, 186

(56) References Cited

U.S. PATENT DOCUMENTS

| | | |
|---|---|---|
| 3,937,523 A | 2/1976 | Ayers, Jr. et al. |
| 4,657,318 A * | 4/1987 | Klein ........................ 303/113.5 |
| 4,699,436 A | 10/1987 | Klein |
| 4,962,971 A * | 10/1990 | Miyake ..................... 303/113.5 |
| 5,150,950 A * | 9/1992 | Arikawa et al. ........... 303/113.5 |
| 5,390,987 A | 2/1995 | Willi et al. |
| 5,632,535 A | 5/1997 | Luckevich et al. |

FOREIGN PATENT DOCUMENTS

| | | |
|---|---|---|
| GB | 2 136 519 B | 1/1987 |
| GB | 2 135 413 B | 2/1987 |

* cited by examiner

*Primary Examiner*—Matthew C. Graham
(74) *Attorney, Agent, or Firm*—MacMillan, Sobanski & Todd, LLC

(57) ABSTRACT

A rear brake proportioning system for a vehicle which is enabled upon the rear wheel speed exceeding a wheel speed threshold and activated upon rear wheel slip exceeding a slip threshold.

18 Claims, 6 Drawing Sheets

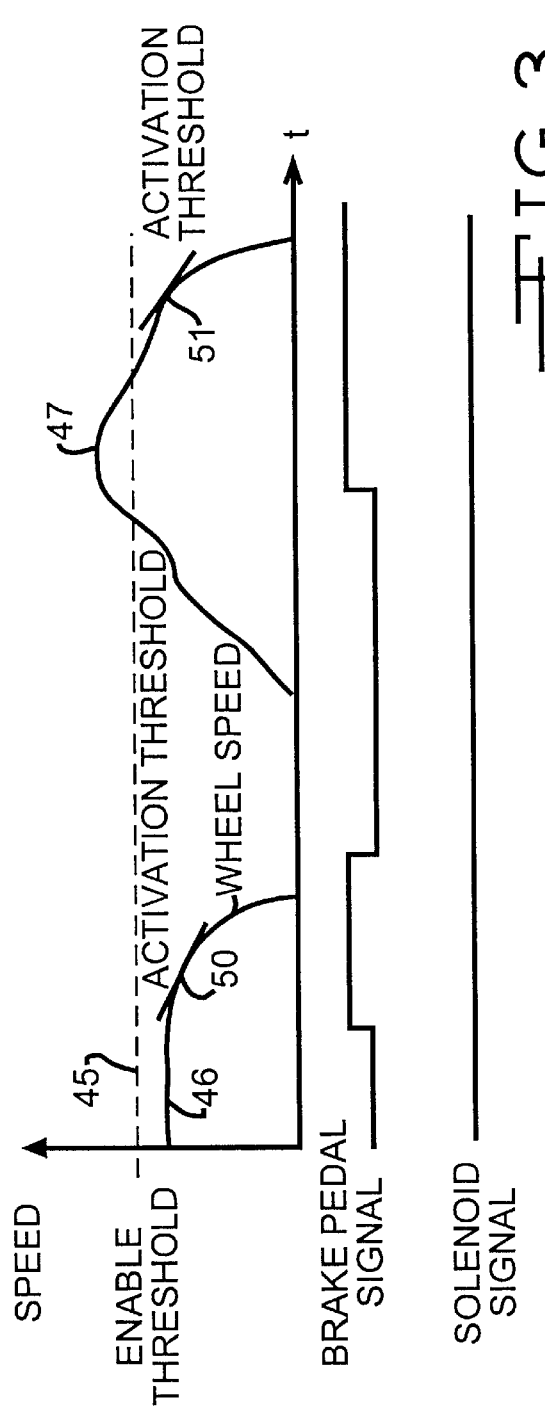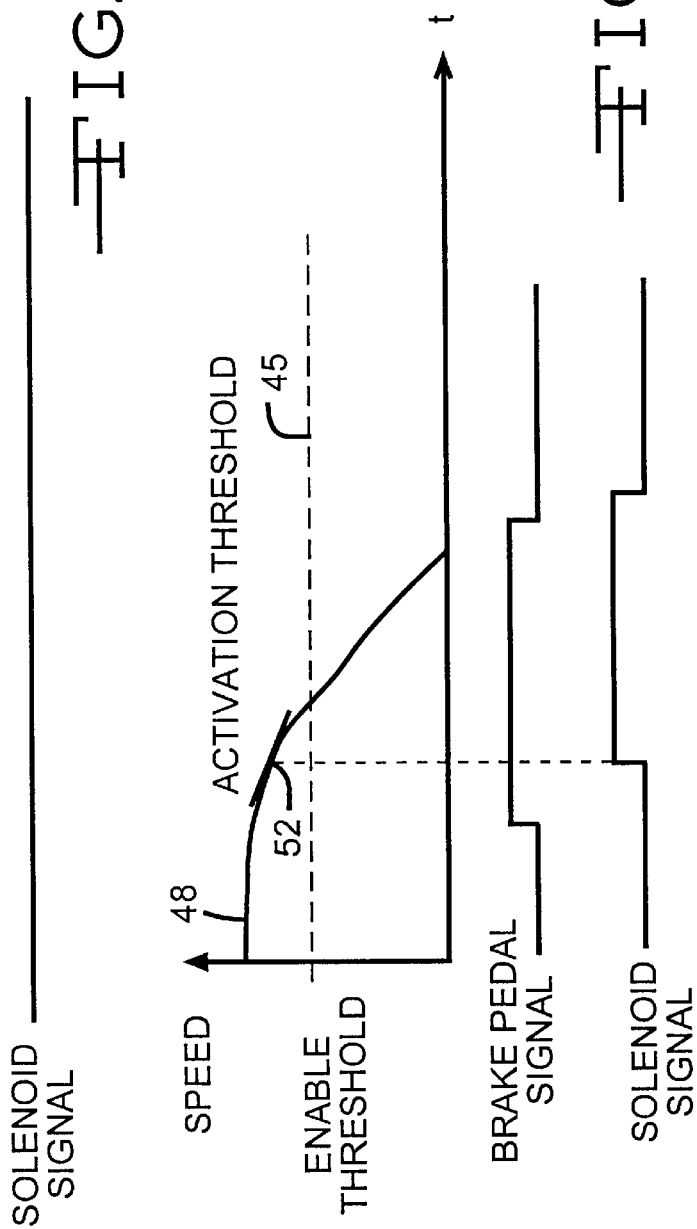

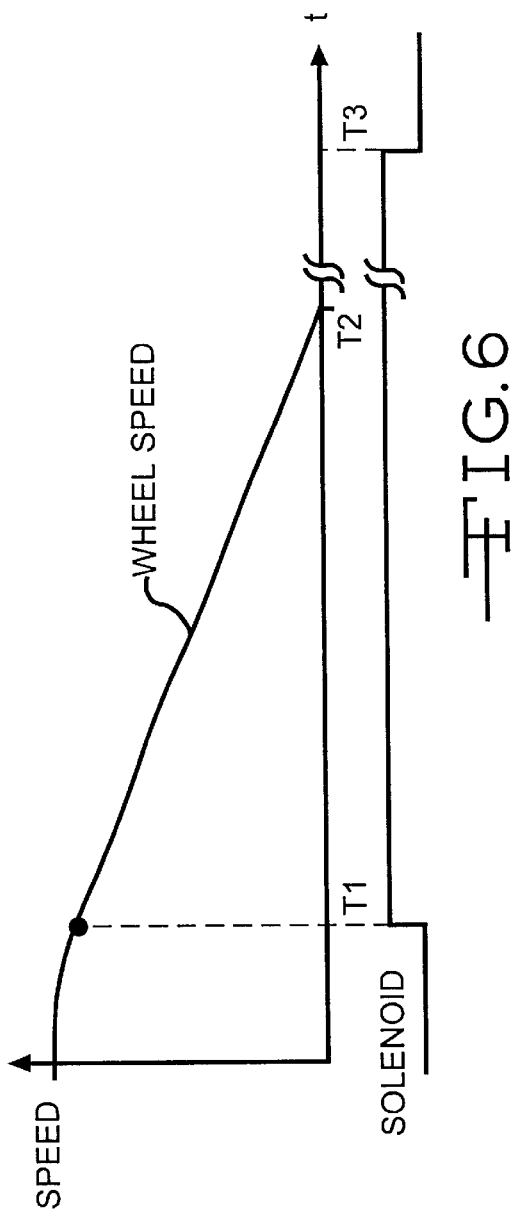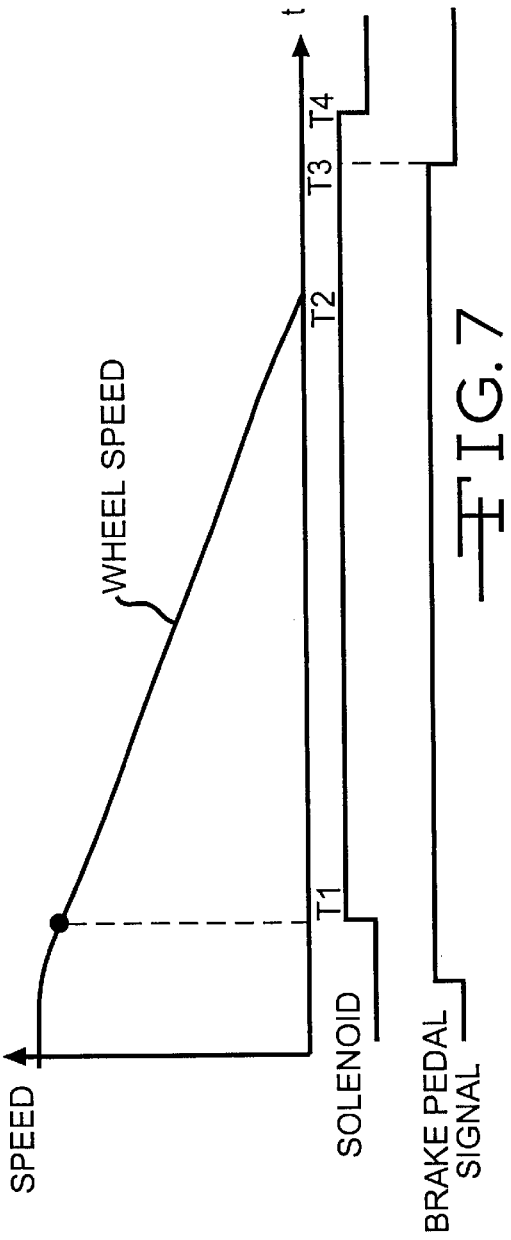

ELECTRONIC REAR BRAKE PROPORTIONING SYSTEM

CROSS REFERENCE TO RELATED APPLICATIONS

This application claims the benefit of U.S. Provisional Application No. 60/039,793, filed Mar. 4, 1997 and International Patent Application No. PCT/US98/04150, filed Mar. 4, 1998.

BACKGROUND OF THE INVENTION

This invention relates in general to vehicle hydraulic brake systems and in particular to an electronic rear brake proportioning system.

Most non-commercial vehicles and light trucks are equipped with hydraulic brake systems having a dual master cylinder which includes separate front and rear hydraulic brake fluid reservoirs and actuating chambers. The front and rear actuating chambers are connected to front and rear brake cylinders, respectively, to define separate front and rear brake circuits. Depressing a brake pedal, which is connected by a mechanical linkage to the master cylinder, applies hydraulic pressure through both brake circuits to the brake cylinders at each of the vehicle wheels. The brake cylinders actuate the front and rear wheel brakes to slow the vehicle. By dividing the brake system into front and rear brake circuits, braking capability is maintained if a brake fluid leak should develop in one of the brake circuits.

During a braking cycle, a portion of the weight of a vehicle is transferred from the rear vehicle wheels to the front vehicle wheels. The transfer of weight increases the frictional force produced between the front vehicle wheels and the road surface while decreasing the frictional force produced between the rear vehicle wheels and the road surface. Accordingly, if an equal braking force is applied to the front and rear vehicle wheels, the transfer of vehicle weight between the rear and front wheels could cause the rear wheels to lock up while the front wheels continue to rotate. A vehicle with locked rear wheels and rotating front wheels could spin-out easily.

To maintain directional stability during a braking cycle, the front wheels must lock up before the rear wheels. Thus, it is known to equip vehicles with disc brakes on the front wheels and drum brakes on the rear wheels or to provide smaller calipers on rear disc brakes than on front disc brakes. The use of more efficient brakes on the front wheels results in a greater braking force being applied to the front wheels than the rear wheels when the same hydraulic pressure is applied to the front and rear brake cylinders.

On a low mu road surface, little or no weight is transferred from the rear to the front of a vehicle during a braking cycle. Thus, the more efficient design of the front brakes is usually sufficient on low mu surfaces to assure that the front wheel brakes lock up before the rear wheel brakes, thereby preserving vehicle directional stability.

On high mu surface roads, however, the greater coefficient of friction of the road surface allows a harder brake application with a corresponding greater vehicle deceleration. The increase in vehicle deceleration results in a transfer of vehicle weight from the rear wheels to the front wheels. With the transfer of vehicle weight, the design of the brake calipers may not be sufficient to assure that the front brakes lock up before the rear brakes. Accordingly, a proportioning valve is typically included in the rear brake circuit.

The proportioning valve is operative to increase the hydraulic pressure applied to the rear wheel brake cylinders at a slower rate than the rate of increase of the hydraulic pressure applied to the front wheel brake cylinders. The different rates of increase result in a greater braking effort occurring at the front wheel brakes than at the rear wheel brakes such that the front wheel brakes lock up before the rear wheel brakes. The proportioning valve is operative only after a predetermined brake pressure threshold has been exceeded. The predetermined brake pressure threshold is commonly referred to as the changeover pressure. For hydraulic pressures below the changeover pressure, the same hydraulic pressure is applied to both the front and rear brake cylinders.

Some vehicles have a diagonally split brake system with the left front and right rear wheel brakes actuated by one actuating chamber of the master cylinder and the right front and left rear wheel brakes actuated by the other actuating chamber of the master cylinder. Thus, if one of the brake circuits should fail, the other brake circuit remains operational to apply braking force at both ends of the vehicle. Such diagonally split brake systems require two proportioning valves, with one proportioning valve included between the master cylinder and each rear wheel brake cylinder.

SUMMARY

This invention relates to an electronic rear brake proportioning system.

As described above, a proportioning valve is typically included in a vehicle brake system to assure that the front wheels will lock up before the rear wheels on a high mu surface. As also described above, on low mu surfaces, the brake pressure seldom exceeds the proportioning valve threshold. Accordingly, the proportioning valve is typically actuated only on high mu surfaces. A unique proportioning valve is calibrated for each particular vehicle to accommodate the vehicle's specific design characteristics to provide an optimum braking response.

It would be desirable if one universal proportioning valve could be provided for different vehicles. Also, for diagonally split systems, it would be desirable to reduce the required number of proportioning valves.

The present invention contemplates an electronic rear brake proportioning system for a vehicle having at least one front wheel brake and one rear wheel brake, the wheel brakes being coupled to and actuated by a master cylinder. The electronic rear brake proportioning system includes a normally open solenoid valve connected between the master cylinder and the rear wheel brake and a controller electrically connected to the solenoid valve The controller is enabled when a first vehicle operating parameter exceeds a first threshold and the controller is operable to close the solenoid valve to isolate the rear wheel brake from the master cylinder when a second vehicle operating parameter exceeds a second threshold.

The system also includes a speed sensor for monitoring the speed of the wheel associated with the rear wheel brake. The speed sensor generates a rear wheel speed signal. The invention also contemplates that the first vehicle operating parameter is the rear wheel speed and that the first threshold is a predetermined rear wheel speed. The controller being enabled when the rear wheel speed exceeds the predetermined rear wheel speed.

It is further contemplated that the controller is operative to calculate a rear wheel slip. In the preferred embodiment, the second vehicle operating parameter is rear wheel slip and the second threshold includes a predetermined value of rear wheel slip. Accordingly, the controller closes the solenoid valve upon being enabled and the rear wheel slip exceeding the rear wheel slip threshold.

The controller also can be operative to calculate a deceleration of the controlled rear wheel. The rear wheel deceleration can the be utilized to calculate a road surface factor which can be combined with the predetermined value of rear wheel slip to define the rear wheel slip threshold. Additionally, the controller can calculate a deceleration factor which is a function of elapsed braking time. The deceleration factor can be combined with the road surface factor and the predetermined value of rear wheel slip to further refine the rear wheel slip threshold.

The present invention also contemplates that the controller is further operable to selectively and intermittently reopen the solenoid valve to increase the pressure applied to the controlled rear wheel brake. Additionally, the controller can be operative to maintain said isolation of the rear wheel brake for a predetermined time period after the vehicle has stopped. Furthermore, the controller can be responsive to a vehicle brake pedal being released to open the solenoid valve after a shortened predetermined time period has elapsed. The controller also can be operative to open the solenoid valve upon the elapse of a predetermined time period following the rear wheel slip falling below the rear wheel slip threshold. Similarly, the controller can be operative to open the solenoid valve upon the elapse of a predetermined time period following the rear wheel speed exceeding a predetermined rear wheel speed recovery threshold.

It also is contemplated that the rear brake proportioning system can be included in an anti-lock brake system or a traction control system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a graph of rear wheel speed vs. time which illustrates the operation of the electronic proportioning system shown in FIG. 1.

FIG. 4 is another graph of rear wheel speed vs. time which illustrates the operation of the electronic proportioning system shown in FIG. 1.

FIG. 6 is a graph of rear wheel speed vs. time which illustrates a deactuation mode for the electronic proportioning system shown in FIG. 1 which occurs following a braking cycle.

FIG. 7 is a graph of rear wheel speed vs. time which illustrates an alternate embodiment of the deactuation mode shown in FIG. 6.

DETAILED DESCRIPTION OF THE PREFERRED EMBODIMENT

Figure 1:
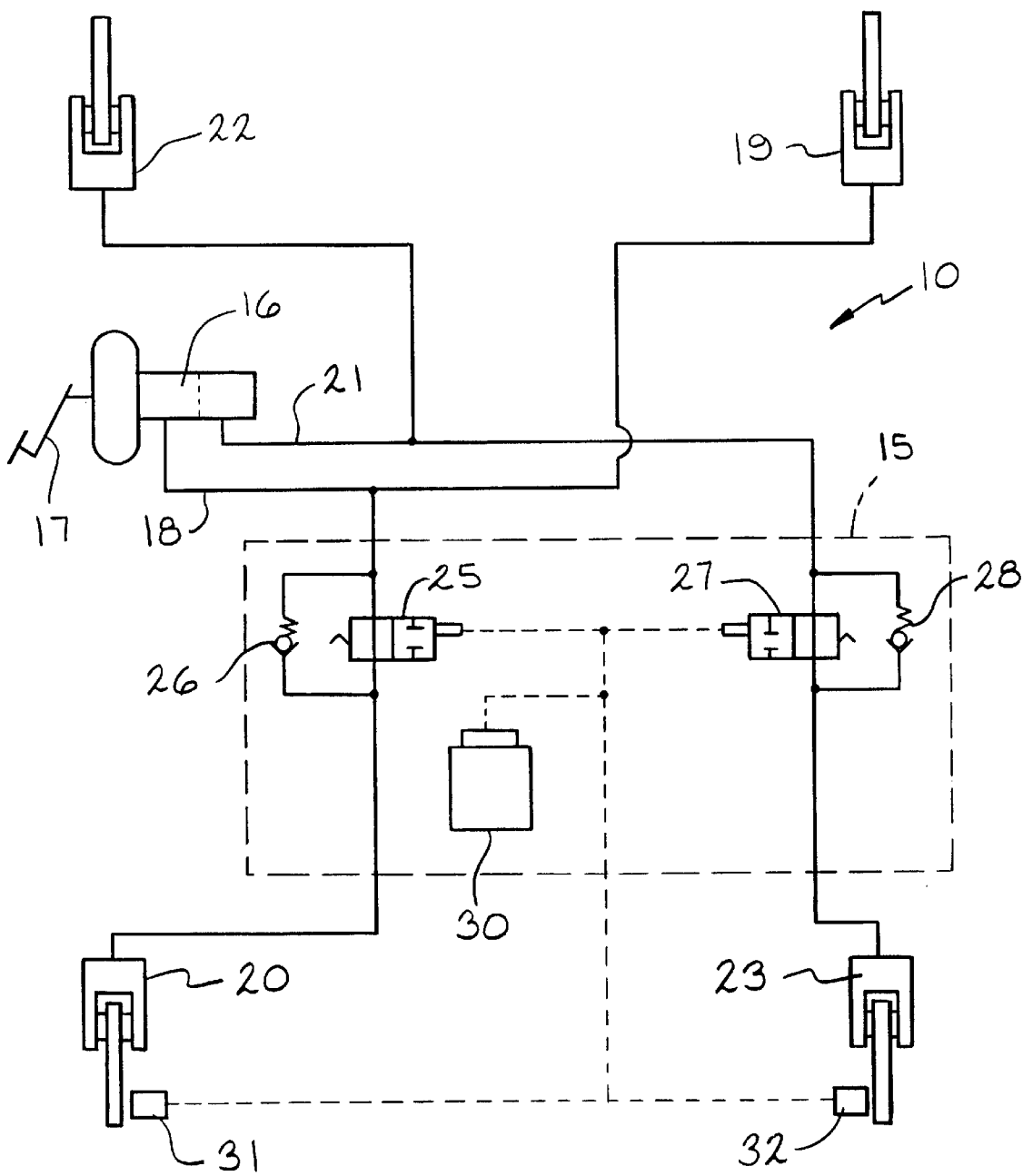
FIG. 1 is a schematic diagram of a vehicle brake system which includes an electronic proportioning system in accordance with the invention.

Referring now to FIG. 1, there is shown at 10, a diagonally split vehicle brake system which includes an electronic rear brake proportioning system 15 in accordance with the invention. The vehicle brake system includes a conventional master cylinder 16 which is actuated by a foot pedal 17. A first hydraulic brake line 18 connects a first chamber of the master cylinder 16 to the right front wheel brake 19 and the left rear wheel brake 20 to define a first brake circuit. Similarly, a second hydraulic line 21 connects a second chamber of the master cylinder 16 to the left front wheel brake 22 and the right rear wheel brake 23 to define a second brake circuit.

The electronic rear brake proportioning system 15 includes a first normally open solenoid valve 25 which is included in the first hydraulic line 18 between the first chamber of the master cylinder 16 and the left rear wheel brake 20. Upon energization of the valve solenoid, the valve 25 closes, blocking communication between the master cylinder 16 and the left rear wheel brake 20. A check valve 26 is connected across the first solenoid valve 25 to return hydraulic fluid to the master cylinder 16 when the brake pedal 17 is released. The proportioning system 15 also includes a second normally open solenoid valve 27 which is included in the second hydraulic line 21 between the second chamber of the master cylinder 16 and the right rear wheel brake 23. Upon energization of the valve solenoid, the valve 27 closes, blocking communication between the master cylinder 16 and the right rear wheel brake 23. A check valve 28 for returning hydraulic fluid from the wheel brake 23 to the master cylinder 16 is connected across the second solenoid valve 27.

The proportioning system 15 further includes an electronic control unit 30 which is electrically connected to the solenoid valves 25 and 27. The electronic control unit 30 also is electrically connected to first and second wheel speed sensors 31 and 32 which are mounted adjacent to the left and right rear wheels, respectively. In the preferred embodiment, the electronic control unit 30 includes a microprocessor (not shown) which is responsive to the wheel speed signals to operate the solenoid valves 25 and 27.

The operation of the electronic proportioning system will now be described. During vehicle braking, the control unit 30 is operative to selectively close the solenoid valves 25 and 27 to block further pressure increases to the rear wheel brakes 20 and 23. Additionally, the control unit 30 also can selectively and intermittently open the valves 25 and 27 to further increase the rear wheel brake pressure.

Figure 2:
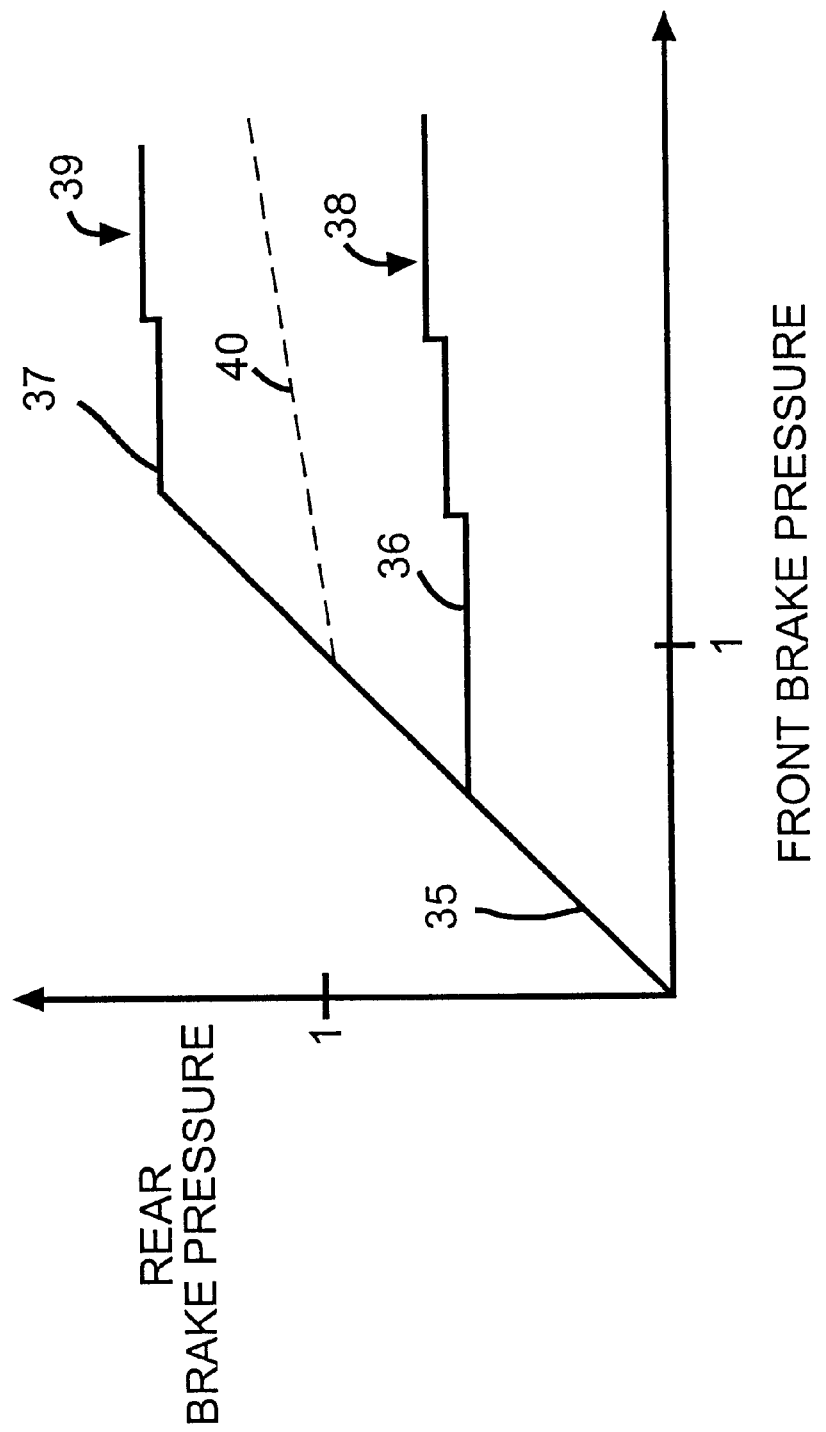
FIG. 2 is a graph of rear brake pressure vs. front brake pressure which illustrates the operation of the electronic proportioning system shown in FIG. 1.

The dynamic operation of the electronic proportioning system 15 is illustrated in FIG. 2. A family of curves is shown, with the rear brake pressure equal to the front brake pressure in the region labeled 35, until a threshold corresponding to optimum braking efficiency has been reached for the given stopping conditions. At this point, the rear brake pressure is maintained at a fixed level by closing the solenoid valves 25 and 27. The rear pressure hold, as indicated at 36 and 37 is maintained only as long as the braking conditions remain within a performance window. The rear brake pressure can be increased by opening the solenoid valves 25 and 27 as the conditions of the stop vary, as indicated at 38 and 39. For comparison, the response of a conventional proportioning valve, as shown in FIG. 2 by the dashed line which is labeled 40, is fixed.

The bottom curve in FIG. 2 shows the rear brake pressure being held below the knee of the conventional proportioning valve response curve 40 and then being increased over time. This would correspond to hard braking during a turn where the rear pressure is kept low, due to high lateral acceleration, to improve vehicle stability. As the vehicle slows, the rear brake pressure can be increased, since the lateral acceleration is decreasing.

The top curve in FIG. 2 demonstrates how the rear brake pressure can increase well above that of a brake system equipped with a conventional proportioning valve to provide increased rear braking capacity. This corresponds to a heavily loaded vehicle being stopped upon a road surface with good adhesion.

The present invention contemplates an electronic rear brake proportioning system having two thresholds which must be met for activation. The operation of the present invention is illustrated in FIGS. 3 and 4 where the rear wheel speed of a vehicle is shown as a function of time. The first threshold is a rear wheel speed threshold, which is shown as a dashed line labeled 45 in FIGS. 3 and 4, for enabling the electronic proportioning system 15. In the following discussion, the threshold 45 will be referred to as an "enabling threshold". In the preferred embodiment, the enabling threshold is a function of road conditions and/or vehicle operating parameters. Alternately, a predetermined value can be used for the enabling threshold. In the preferred embodiment, the enabling threshold is in the range of 15 to 20 miles per hour. The electronic proportioning system 15 can only be actuated when the rear wheel speed exceeds the enabling threshold 45.

Once enabled, the electronic proportioning system 15 is only activated when rear wheel slip, which is the difference between the actual rear wheel speed and a theoretical rear wheel speed calculated from a predetermined maximum vehicle deceleration, exceeds a second threshold. The second threshold, which will be referred to as an "vactivation threshold", will be described in detail below.

In FIG. 3, actual rear wheel speed as a function of time is shown as two curves labeled 46 and 47 during two braking cycles while in FIG. 4 rear wheel speed is shown as one curve labeled 48. Because the activation threshold is related to vehicle deceleration, the activation threshold is, for simplicity, represented in FIGS. 3 and 4 by a sloping line. The brake pedal and solenoid actuation signals are also shown in FIGS. 3 and 4. The point at which the rear wheel slip exceeds the activation threshold is labeled 50 for the curve 46, while the corresponding points are labeled 51 and 52 for curves 47 and 48, respectively.

As described above, the present invention contemplates activating the electronic proportioning system 15 only when both the rear wheel speed exceeds the enabling threshold and the rear wheel slip exceeds the activation threshold. Thus, for the examples shown in FIG. 3, while the curve 46 does have a slip exceeding the activation threshold, the slip occurs while the rear wheel speed is less than the enabling threshold 45. Accordingly, the electronic proportioning system 15 is not activated during the braking cycle represented by the curve 46 and the pressure applied to the rear wheel brakes 20 and 23 is the same as the pressure applied to the front wheel brakes 19 and 22.

While the rear wheel speed represented by the curve 47 does exceed the enabling threshold 45 for a portion of the braking cycle, the rear wheel speed has dropped below the enabling threshold before the rear wheel slip exceeds the activation threshold at 51. Accordingly, the electronic proportioning system 15 is not activated during the braking cycle represented by the curve 47 and the same pressure is applied to all of the vehicle wheel brakes.

In FIG. 4, the activation threshold 52 is exceeded while the rear wheel speed is above the enabling threshold 45. Accordingly, the electronic proportioning system 15 is activated and the solenoid valves 25 and 27 are closed to isolate the rear wheel bakes 20 and 23 from the master cylinder 16 and any further increase in brake pressure.

The present invention further contemplates that the activation threshold is a combination of functions of the rear wheel speed, the road surface condition and elapsed time. This approach is necessary for the brake system illustrated in FIG. 1 since the actual vehicle speed is unknown because only rear wheel speeds are measured. Accordingly, the rear wheels could be decelerating at the same rate as the projected deceleration. In such a situation, the wheel slip is zero, and the electronic proportioning system 15 will never be actuated as the rear wheel "sneaks-down" to a stop. Because the proportioning system 15 is not actuated, the potential exists for the rear wheels to lock-up before the front wheels, which could cause the vehicle to spin-out. Thus, the activation threshold for the proportioning system 15 includes additional factors which compensate for sneakdown conditions.

Figure 5:
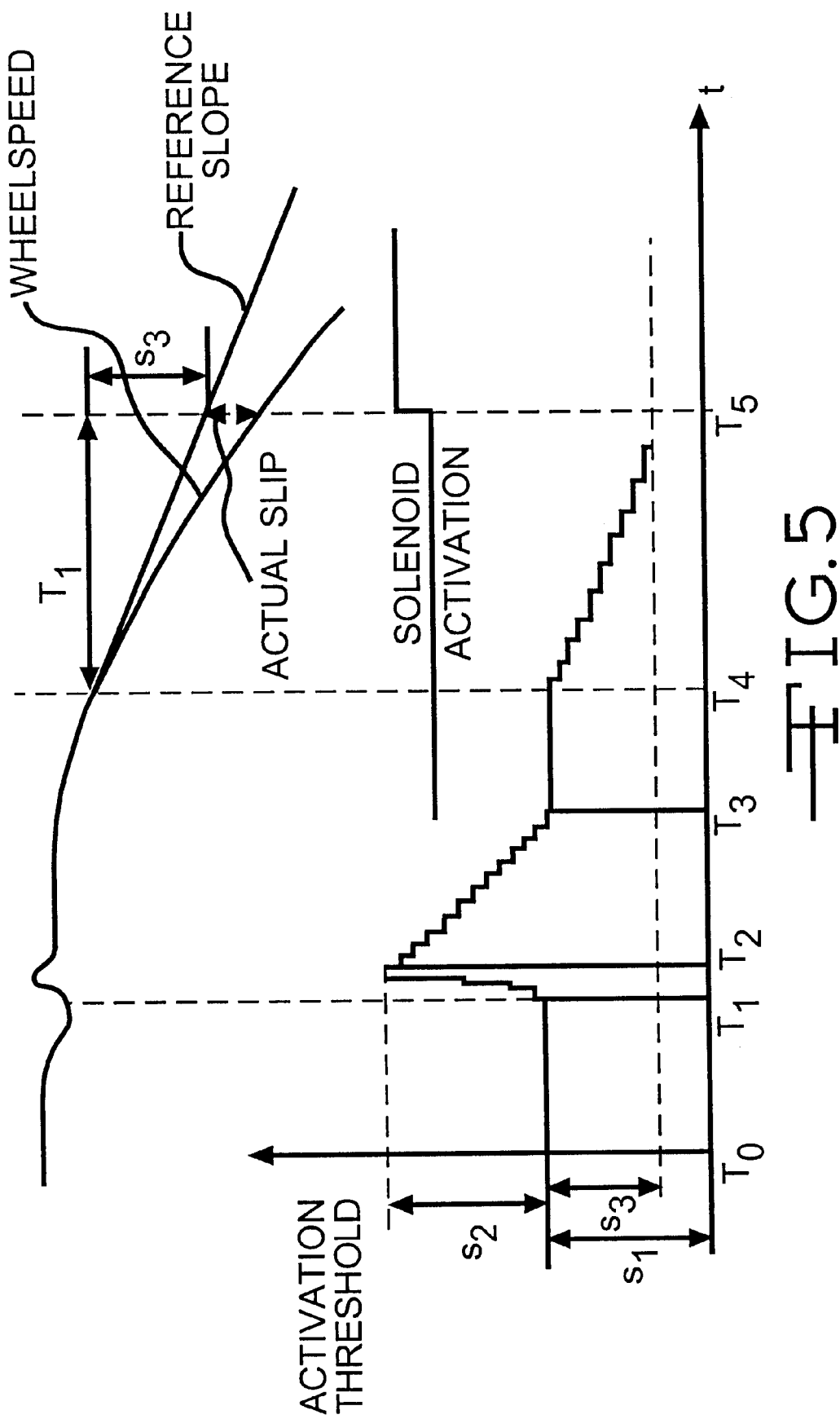
FIG. 5 is a graph of rear wheel speed vs. time which illustrates a component of an alternate slip threshold for the electronic proportioning system shown in FIG. 1.

The activation threshold is illustrated in FIG. 5 and is a combination of three factors as generally described by the equation:

$$s_t = s_1 + s_2 - s_3; \text{ where:}$$

$s_t$ is the activation threshold;

$s_1$ is a vehicle slip factor;

$s_2$ is a road surface factor which corresponds to the roughness of the road surface; and $s_3$ is a deceleration factor.

The calculation and application of the activation threshold is best understood in light of the example illustrated in FIG. 5. In the example, it is assumed that the rear wheel speed is above the enabling threshold and that the electronic proportioning system 15 is enabled. From $t_0$ to $t_1$, the vehicle is operating at a constant speed and the actuation threshold $s_t$ is equal to only the vehicle slip factor $s_1$ which is a percentage of the wheel speed. The percentage is selected for a particular vehicle, such as, for example, three percent of the rear wheel speed, which is a typical value. Thus, from $t_0$ to $t_1$, $s_t$ is simply $s_1$.

Just prior to $t_1$ the vehicle rear wheels strike a bump in the road, which causes a deceleration and then an acceleration of the rear wheels, as shown by the negative and positive excursion in the wheel speed curve shown in FIG. 5. When the rear wheels accelerate, the activation threshold should be increased to account for the deceleration which will follow as the wheel speed returns to normal. Otherwise, the wheel deceleration during recovery from striking the bump in the road could trigger a false operation of the electronic proportioning system 15. Accordingly, the second term shown in the above equation, the road surface factor $s_2$, is added to the vehicle slip factor $s_1$ and the activation threshold becomes:

$$s_t = s_1 + s_2, \text{ as shown from } t_1 \text{ to } t_2 \text{ in FIG. 5.}$$

The road surface factor $s_2$ is a function of positive wheel acceleration and equals a predetermined wheel speed increment, such as, for example, one mph/g, multiplied by the magnitude of the rear wheel acceleration. The predetermined wheel speed increment is selected for the particular vehicle. As shown in FIG. 5, the rear wheel speed is sampled and the acceleration calculated several times during the wheel acceleration, which occurs between $t_1$ and $t_2$. Each calculation results in a new value for the road surface factor $s_2$.

At $t_2$, the acceleration ends and the rear wheel begins to decelerate to the prebump speed. Accordingly, the actuation threshold should be returned to the previous value, $s_1$. The software in the control unit 30 decrements the actuation threshold $s_t$ at a predetermined rate, such as, for example, 0.25 mph/5 milisec, from $t_2$ to $t_3$ until the road surface factor $s_2$ is reduced to zero, which occurs at $t_3$ in FIG. 5.

At $t_3$, the vehicle brakes are applied. The controller 30 assumes the current vehicle slip factor $s_1$, which is calculated from the present rear wheel speed, for the activation threshold $s_t$.

At $t_4$, the rear wheel deceleration reaches a deceleration threshold $t_d$, which is determined for the particular vehicle. For example, the deceleration threshold $t_d$ could be 0.5 g. Thus, at $t_4$, a reference rear wheel speed is calculated from the deceleration threshold $t_d$ and projected as a straight line which is labeled "reference slope" in FIG. 5. The actual rear wheel speed, which continues to decrease, is compared to the reference rear wheel speed represented in FIG. 5 by the reference slope. The difference between the actual rear wheel speed and the reference rear wheel speed is the rear wheel slip. The rear wheel slip is compared to the activation threshold $s_t$.

To avoid a sneak-down situation, the activation threshold is progressively decreased by the third factor, $s_3$. Thus, from $t_4$ to $t_5$ in FIG. 5, the activation threshold includes two activation criteria which can be expressed as:

$$s_t = s_1 - s_3.$$

Where $s_3$ is the product of the deceleration threshold $t_d$ and the running time $t_r$, i.e., the elapsed since the deceleration threshold was reached, multiplied by a factor, F, selected to vary the slope of the reference wheel speed line. Accordingly:

$$s_3 = t_d * t_r * F.$$

Thus, the activation threshold is:

$$s_t = s_1 - t_d * t_r * F.$$

Accordingly, the activation threshold $s_t$ is progressively reduced from $t_4$ to $t_5$. As shown in FIG. 5, while the activation threshold is being reduced, the actual wheel slip is increasing. At $t_5$, the actual rear wheel slip becomes equal to the activation threshold st and the electronic control unit 30 closes the solenoid valves 25 and 27.

If the rear wheel deceleration should become less than the deceleration threshold $t_d$ before the system 15 is activated, the running time $t_r$ is reset to zero and calculation reinitiated if the rear wheel deceleration again increases to the deceleration threshold $t_d$.

While the consideration of the road surface factor $s_2$ and the deceleration factor $s_3$ have been separated in time for simplicity in the example illustrated in FIG. 5, it will be appreciated that both factors $s_2$ and $s_3$ can be occurring simultaneously.

The present invention further contemplates several modes of operation for deactivation of the electronic proportioning system 15. A mode of deactivation following a braking cycle is illustrated in FIG. 6 wherein the solenoid valves 25 and 27 are actuated at $t_1$ to maintain the rear brake pressure at a constant level. For simplicity, any deactivation of the solenoid valves 25 and 27 to increase the rear brake pressure has been omitted. The vehicle is braked to a stop at $t_2$ and typically the vehicle operator continues to apply pressure to the brake pedal 17. If the solenoid valves 25 and 27 are immediately opened at $t_2$, additional hydraulic fluid will be supplied from the master cylinder 16 to the rear wheel brakes 20 and 23. When this happens, the vehicle operator will feel the brake pedal 17 drop, which can be disconcerting to the operator. Accordingly, the present invention contemplates maintaining the activation of the solenoid valves 25 and 27 for a predetermined period of time, $t_3$–$t_2$, after the vehicle has stopped. Thus, the solenoid valves 25 and 27 remain activated until $t_3$ in FIG. 6. In the preferred embodiment, the predetermined period of time is 30 seconds, which allows the vehicle operator to release the brake pedal 17 before experiencing the drop associated with the release of the solenoid valves 25 and 27.

FIG. 7 illustrates an alternate embodiment of the above deactivation mode. The solenoid valves 25 and 27 are again activated at $t_1$ and the vehicle comes to a stop at $t_2$, as described above. The predetermined time delay for releasing the solenoids 25 and 27 begins running; however, at $t_3$, the vehicle operator removes his foot from the brake pedal 17 and the pedal 17 is no longer subject to pedal drop. The electronic control unit 30 senses that the brake pedal 17 has been released through an electrical connection to the vehicle brake light switch (not shown). Accordingly, after a short delay, the electronic controller 30 deactuates the solenoid valves 25 and 27 at $t_4$, where $t_4$ can occur before the predetermined time period has elapsed. Thus, the on-time of the solenoid valves 25 and 27 can be reduced when there is no need to shield the vehicle operator from pedal drop.

Figure 8:
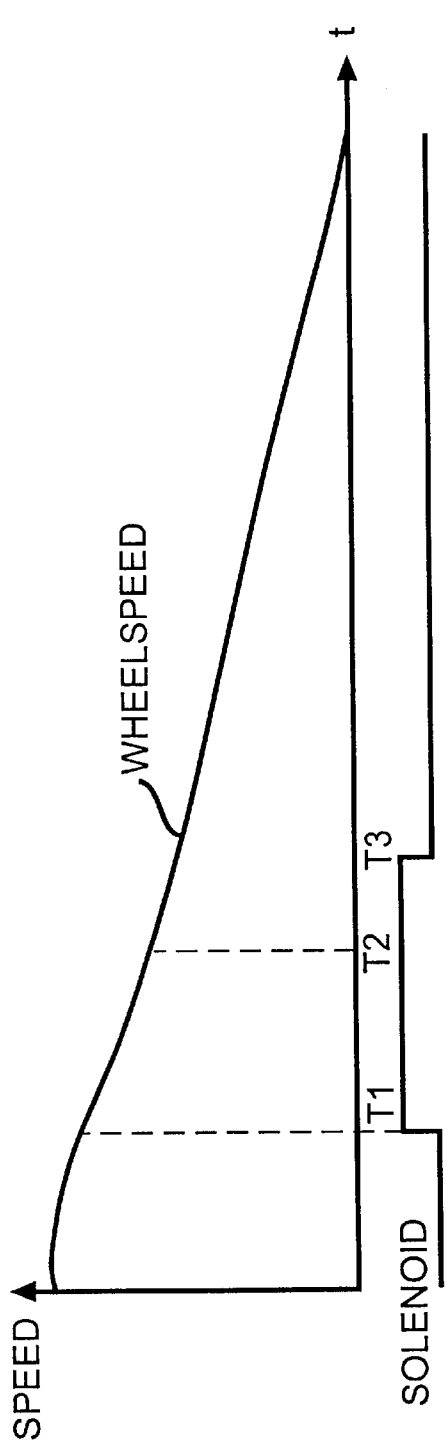
FIG. 8 is a graph of rear wheel speed vs. time which illustrates a deactuation mode for the electronic proportioning system shown in FIG. 1 which occurs during a braking cycle.

A mode of deactivation which occurs during the braking cycle is illustrated in FIG. 8. The solenoid valves are closed at $t_1$ when the rear wheel slip exceeds the activation threshold. At $t_2$, the rear wheel slip drops below the system activation threshold. Accordingly, the electronic controller 30 would be operative to reopen the solenoid valves 25 and 27. However, the change in the rear wheel deceleration could be a false signal caused by a temporary road condition, such as the rear wheel striking a bump. Accordingly, the present invention contemplates maintaining the valves 25 and 27 closed for a short predetermined time period, $t_3$–$t_2$, to assure that the controller 30 is not reacting to a false deceleration signal.

Thus, the solenoid valves 25 and 27 are not reopened until $t_3$.

Figure 9:
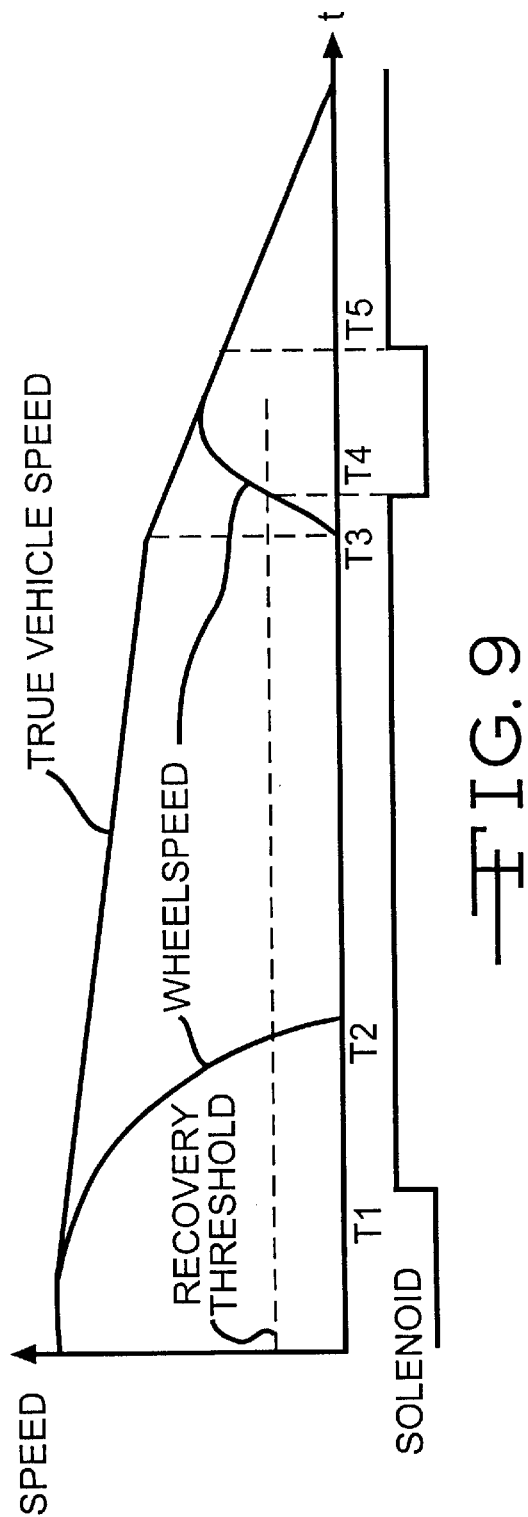
FIG. 9 is a graph of rear wheel speed vs. time which illustrates another deactuation mode for the electronic proportioning system shown in FIG. 1.

FIG. 9 illustrates a braking cycle on a low-mu road surface, such as mu less than 0.3 g. On a low-mu surface, it is not necessary to avoid lock-up of the rear wheels because the weight redistribution from the rear wheels to the front wheels during a braking cycle will cause the front wheels to lock-up before the rear wheels, which will keep the vehicle stable. However, on deep snow, locked rear wheels arc most efficient for stopping the vehicle.

In FIG. 9, the activation threshold is exceeded at $t_1$ and the solenoid valves 25 and 27 are closed. At $t_2$, the rear wheels have locked-up and stopped and the time delay for reopening the valves 25 and 27 begins running. However, the vehicle is still in motion, as shown by the curve labeled "true vehicle speed". Before the time delay expires, a low to high mu road surface transition occurs at $t_3$. With the higher mu surface, the braking efficiency of the front wheel brakes increases, causing the vehicle deceleration to increase. Accordingly, the rear wheels begin to recover to vehicle speed. If the rear wheel speed exceeds a predetermined rear wheel speed recovery threshold, such as, for example five miles per hour, the electronic rear brake proportioning system 15 is deactuated, as shown at $t_4$, after a short time delay, which, in the preferred embodiment is 100 milisec. The pressure applied to the rear brakes is then increased until the activation threshold is again exceed at $t_5$, at which time the system 15 is reactivated. Thus, the wheel speed threshold assures that the rear wheel brake efficiency is increased if the vehicle transitions onto a higher mu road surface.

It is noted that when the electronic rear brake proportioning system 15 is applied to a diagonally split brake system, two proportioning valves can be eliminated from the brake system. While the invention has been described above for a diagonally split brake system, it will be appreciated that the invention also can be practiced on a vertically split brake system. In a vertically split brake system a single hydraulic line typically connects the master cylinder to both rear wheel brake cylinders (not shown) to define the rear brake circuit. For such a system, only one solenoid valve, which is inserted in the single hydraulic line between the master cylinder and the rear wheel brake cylinders, is needed.

The present invention further contemplates an alternate embodiment (not shown) having diagonal wheel speed sensing. In the alternate embodiment, one wheel speed sensor is located adjacent to a front vehicle wheel while the other sensor is located adjacent to a diagonally opposite rear vehicle wheel. Such an arrangement would monitor both front and rear wheel speeds to further enhance the operation of the electronic proportioning system 15. For example, the front wheel speed sensor could provide actual vehicle wheel speed data to the electronic control unit 30.

While the invention has been described and illustrated above as an independent system, it will be appreciated that the invention also can be included in other systems utilizing solenoid valves to control hydraulic pressure applied to vehicle wheel brakes. Examples of such systems include anti-lock brake, traction control and vehicle stability control systems. Such systems typically include solenoid actuated isolation valves and an electronic control unit. Accordingly, the hardware required for the present invention is all ready present upon the vehicle. Thus, the present invention would eliminate the need for separate proportioning valves.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronic rear brake proportioning system for a vehicle having at least one front wheel brake and one rear wheel brake, the wheel brakes being coupled to and actuated by a master cylinder, the electronic rear brake proportioning system comprising:

a normally open solenoid valve connected between the master cylinder and the rear wheel brake; and a controller electrically connected to said solenoid valve, said controller being enabled when a first vehicle operating parameter exceeds a first threshold and said controller being operable to close said solenoid valve to isolate the rear wheel brake from the master cylinder when a second vehicle operating parameter exceeds a second threshold while said first operating parameter continues to exceed said first threshold.

2. A rear brake proportioning system according to claim 1 further including a speed sensor for monitoring a speed of the wheel associated with the rear wheel brake, said speed sensor generating a rear wheel speed signal, and wherein said first vehicle operating parameter is said rear wheel speed and said first threshold is a predetermined rear wheel speed, said controller being enabled when the rear wheel speed exceeds said predetermined rear wheel speed.

3. A rear brake proportioning system according to claim 2 wherein said controller is operative to calculate a rear wheel slip, and further wherein said second vehicle operating parameter is said rear wheel slip and said second threshold includes a predetermined value of rear wheel slip, said controller closing said solenoid valve upon being enabled and said rear wheel slip exceeding said rear wheel slip threshold.

4. A rear brake proportioning system according to claim 3 wherein said controller is operative to calculate a deceleration of the controlled rear wheel and further wherein said second threshold also includes a road surface factor which is a function of said rear wheel deceleration, said second threshold being a combination of said road surface factor and said predetermined value of rear wheel slip.

5. A rear brake proportioning system according to claim 4 wherein said controller is operative to calculate a deceleration factor which is a function of elapsed braking time and further wherein said second threshold also includes said deceleration factor, said deceleration factor being combined with said road surface factor and said predetermined value of rear wheel slip.

6. A rear brake proportioning system according to claim 3 wherein said controller is operative to calculate a deceleration of the controlled rear wheel and further wherein said second threshold also includes a deceleration factor which is a function of elapsed braking time, said second threshold being a combination of said road deceleration factor and said predetermined value of rear wheel slip.

7. A rear brake proportioning system according to claim 6 wherein said controller is operative to calculate a road surface factor which is a function of rear wheel deceleration and further wherein said second threshold also includes said road surface factor, said road surface factor being combined with said deceleration factor and said predetermined value of rear wheel slip.

8. A rear brake proportioning system according to claim 3 further including a front wheel speed sensor for monitoring the speed of the wheel associated with the front wheel brake, said controller being responsive to said front wheel speed to activate said solenoid valve.

9. A rear brake proportioning system according to claim 3 wherein said controller is further operable to selectively and intermittently reopen said solenoid valve to increase the pressure applied to said controlled rear wheel brake.

10. A rear brake proportioning system according to claim 3 said controller is operative to maintain said isolation of the rear wheel brake for a predetermined time period after the vehicle has stopped.

11. An electronic rear brake proportioning system according to claim 10 wherein said predetermined time period is a first predetermined time period and further wherein said controller is responsive to a vehicle brake pedal being released to open said solenoid valve after a second predetermined time period has elapsed, said second time period being shorter than said first time period.

12. A rear brake proportioning system according to claim 3 wherein said controller is operative to open said solenoid valve upon the elapse of a predetermined time period following said rear wheel slip falling below said rear wheel slip threshold.

13. A rear brake proportioning system according to claim 3 wherein said controller is operative to open said solenoid valve upon the elapse of a predetermined time period following said rear wheel speed exceeding a predetermined rear-wheel speed recovery threshold.

14. A rear brake proportioning system according to claim 3 wherein the rear brake proportioning system is included in an anti-lock brake system.

15. A rear brake proportioning system according to claim 3 wherein the rear brake proportioning system is included in a traction control system.

16. An electronic rear brake proportioning system for a vehicle having at least one front wheel brake and one rear wheel brake, the wheel brakes being actuated by a master cylinder, the electronic rear brake proportioning system comprising:

a normally open solenoid valve connected between the master cylinder and the rear wheel brake;

a speed sensor for monitoring the speed of the wheel associated with the rear wheel brake, said speed sensor generating a rear wheel speed signal; and a controller electrically connected to said speed sensor and said solenoid valve, said controller being responsive to only said rear wheel speed signal during a braking cycle to close said solenoid valve to isolate said rear wheel brake from said master cylinder and maintain said isolation for a first predetermined time period after the vehicle has stopped.

17. An electronic rear brake proportioning system according to claim 16 wherein said predetermined time period is a first predetermined time period and further wherein said controller is responsive to a vehicle brake pedal being released to open said solenoid valve after a second predetermined time period has elapsed, said second time period being shorter than said first time period.

18. An electronic rear brake proportioning system for a vehicle having at least one front wheel brake and one rear wheel brake, the wheel brakes being actuated by a master cylinder, the electronic rear brake proportioning system comprising:

a normally open solenoid valve connected between the master cylinder and the rear wheel brake;

a speed sensor for monitoring the speed of the wheel associated with the rear wheel brake, said speed sensor generating a rear wheel speed signal; and a controller electrically connected to said speed sensor and said solenoid valve, said controller being responsive to only said rear wheel speed signal during a braking cycle to close said solenoid valve to isolate said rear wheel brake from said master cylinder, said controller further being operative to open said solenoid valve upon the elapse of a predetermined time period following said rear wheel speed exceeding a predetermined rear wheel speed recovery threshold.

* * * * *

UNITED STATES PATENT AND TRADEMARK OFFICE
CERTIFICATE OF CORRECTION

PATENT NO. : 6,357,836 B1
DATED : March 19, 2002
INVENTOR(S) : Hubert E. Schmitt et al.

It is certified that error appears in the above-identified patent and that said Letters Patent is hereby corrected as shown below:

<u>Title page,</u>
Under Related U.S. Application Data, insert the following:

-- Continuation of PCT/US 98/04150, filed on March 4, 1998. --

Signed and Sealed this

Twenty-eighth Day of May, 2002

*Attest:*

JAMES E. ROGAN
*Attesting Officer*     *Director of the United States Patent and Trademark Office*